US012715085B2

(12) United States Patent
Neufeld

(10) Patent No.: US 12,715,085 B2
(45) Date of Patent: Aug. 25, 2026

(54) MULTI-PURPOSE HAND TOOL

(71) Applicant: Jacob Neufeld, Camrose (CA)

(72) Inventor: Jacob Neufeld, Camrose (CA)

( * ) Notice: Subject to any disclaimer, the term of this patent is extended or adjusted under 35 U.S.C. 154(b) by 315 days.

(21) Appl. No.: 18/632,249

(22) Filed: Apr. 10, 2024

(65) Prior Publication Data

US 2025/0319574 A1 Oct. 16, 2025

(51) Int. Cl.

| | |
|---|---|
| ***B25B 7/22*** | (2006.01) |
| ***B25B 7/08*** | (2006.01) |
| ***B25C 11/00*** | (2006.01) |

(52) U.S. Cl.

CPC .................. *B25B 7/22* (2013.01); *B25B 7/08* (2013.01); *B25C 11/00* (2013.01)

(58) Field of Classification Search

CPC .. B25B 7/22; B25B 7/08; B25B 1/006; B25B 1/003; B25C 11/00

USPC ...................................... 7/117; 254/26 R, 27

See application file for complete search history.

(56) References Cited

U.S. PATENT DOCUMENTS

| | | | | |
|---|---|---|---|---|
| 551,993 A * | 12/1895 | Norton | B25D 1/04 | 254/26 R |
| 1,946,742 A * | 2/1934 | Hingst | B25B 7/02 | 254/28 |
| 2,747,835 A * | 5/1956 | Belgard | B25D 1/045 | 254/26 R |
| D319,958 S * | 9/1991 | Fletcher | D8/54 | |
| 6,314,599 B1 * | 11/2001 | Hay | B25F 1/006 | 7/137 |
| 7,065,819 B1 * | 6/2006 | Minniti | B25B 7/08 | 7/128 |

* cited by examiner

*Primary Examiner* — Hadi Shakeri
(74) *Attorney, Agent, or Firm* — Orin Del Vecchio

(57) ABSTRACT

A hand tool that is configured to assist a user in the performance of tasks commonly associated with installation and repair of fencing. The invention includes a body having a first side and a second side. The first side and second side of the body are pivotally coupled at a central axis point. The central axis point is surroundably mounted by a hub member. A head portion includes a first main jaw member and a second main jaw member. An extraction member is operably coupled to the head portion being perpendicular thereto extending outward therefrom. The extraction member includes a first leg member and a second leg member having a void therebetween. The extraction member includes an upper portion contiguous with the leg members wherein the upper portion has an outer peripheral edge having an arcuate section forming a tip operable to engage an object such as a fence staple.

5 Claims, 2 Drawing Sheets

MULTI-PURPOSE HAND TOOL

FIELD OF THE INVENTION

The present invention relates generally to hand tools, more specifically but not by way of limitation, a hand tool configured to execute tasks associate with installation and repair of fencing wherein the present invention includes a staple and nail puller integrally formed on the head portion that has an orientation perpendicular to the head portion.

BACKGROUND

As is known in the art, fencing pliers are commonly utilized during installation and repair of fencing. These tools provide elements that assist a user in performing the plurality of tasks associated with installation and repair of fencing. Conventional fencing pliers include a body having a first side and a second side that are pivotally connected at a central axis point facilitating a scissor-like movement of the first side and second side of the body. The first side and second side include elongated handle portions wherein the elongated handle portions are covered with grip members and provide leverage for certain tasks performed utilizing the fencing pliers.

Common elements for conventional fencing pliers include opposing main jaw members, ferrule crimping jaws, grooved hammer face on one of the jaw members and a tapered end on the opposing jaw member for pulling nails and staples. The conventional design for the taper end on the jaw member provides a shape that comes to a point and is integrally formed with the jaw member. The orientation of the tapered end is the same as the jaw member which can result in problems during removal of fence staples. Many times the shape of the jaw members is such that the jaw member will damage the fence post while pulling the staple. Additionally, with the conventional design of a pivotally connected first side and second side, leverage to pull out fence staples is compromised.

Accordingly, there is a need for a hand tool that is configured to assist a user in performing tasks while engaged in installation and repair of fencing wherein the present invention includes an extraction member that is operably coupled to the head portion wherein the extraction member is perpendicular to the head portion of the hand tool.

SUMMARY OF THE INVENTION

It is the object of the present invention to provide a hand tool that is configured to assist a user in performing tasks associated with installation and repair of fencing wherein the present invention includes a body having a first side and a second side that are pivotally coupled at a central axis point.

Another object of the present invention is to provide fencing pliers being configured to assist in tasks associated with the installation and repair of fencing wherein the present invention includes a head portion having a first jaw member and a second jaw member.

A further object of the present invention is to provide a hand tool that is configured to assist a user in performing tasks associated with installation and repair of fencing wherein the present invention includes an extraction member operably coupled to the hub member surrounding the central axis point.

Yet a further object of the present invention is to provide fencing pliers being configured to assist in tasks associated with the installation and repair of fencing wherein the extraction member is perpendicular to the hub member extending outward therefrom.

Still another object of the present invention is to provide a hand tool that is configured to assist a user in performing tasks associated with installation and repair of fencing wherein the extraction member includes a first leg member and a second leg member.

An additional object of the present invention is to provide fencing pliers being configured to assist in tasks associated with the installation and repair of fencing wherein the first leg member and second leg member of the extraction member are contiguously formed with an upper portion.

Yet a further object of the present invention is to provide a hand tool that is configured to assist a user in performing tasks associated with installation and repair of fencing wherein the upper portion includes an end portion wherein the end portion includes a tapered point.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
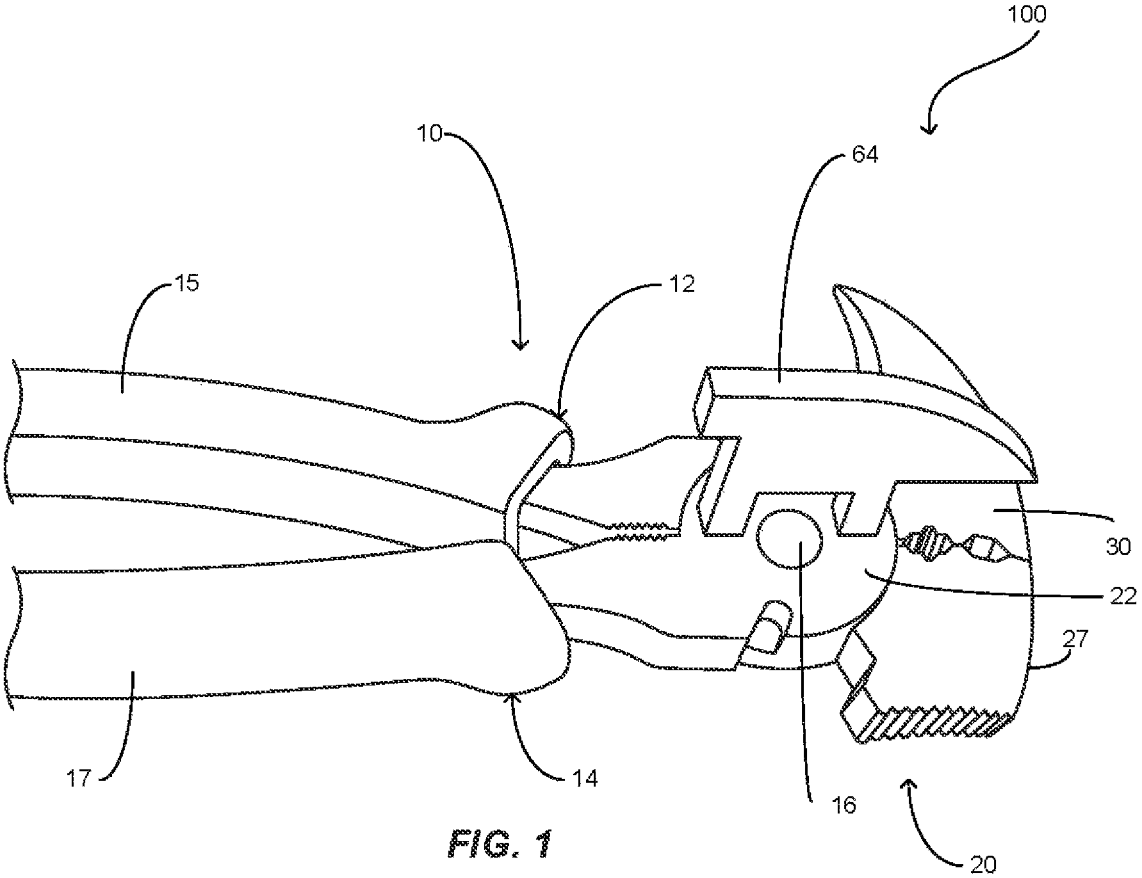
FIG. 1 is a top perspective view of the present invention.
Figure 2:
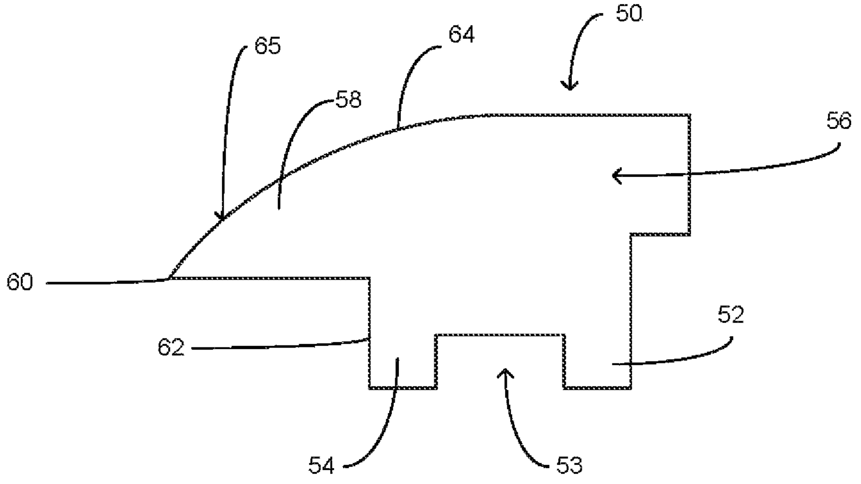
FIG. 2 is a side view of the extraction member.
Figure 3:
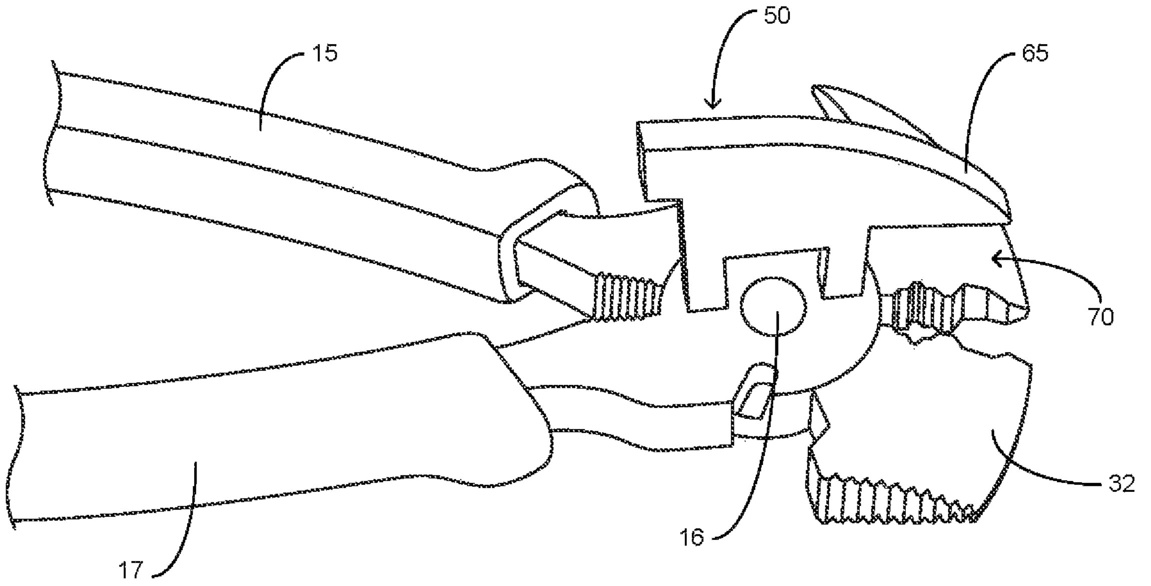
FIG. 3 is a perspective view of the present invention.

Referring now to the drawings submitted herewith, wherein various elements depicted therein are not necessarily drawn to scale and wherein through the views and figures like elements are referenced with identical reference numerals, there is illustrated a hand tool 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the hand tool 100 is configured to assist a user in performing tasks commonly associated with repair and installation of fencing. The hand tool 100 includes a body 10 wherein the body 10 includes a first side 12 and a second side 14. The first side 12 and second side 14 of the body 10 are pivotally connected at a central axis point 16 wherein the central axis point 16 is located in the head portion 20 of the hand tool 100. The central axis point 16 is surroundably mounted with hub member 22 wherein the hub member 22 is annular in shape being integrally formed with the head portion 20. The first side 12 and second side 14 include elongated handle portions 15,17 respectively.

The head portion 20 include a first main jaw member 30 and a second main jaw member 32. Second main jaw member 32 includes a grooved hammer face portion 34 formed thereon that is configured to assist in the driving of fence staples. Ferrule crimping jaw members 40 are integrally formed into the head portion 20 wherein the ferrule crimping jaw members 40 are configured to provide compression of ferrules.

The head portion 20 has operably secured thereto an extraction member 50. The extraction member 50 is secured to the head portion 20 proximate the hub member 22 utilizing suitable techniques such as but not limited to welding. The extraction member 50 is secured to the head portion 20 wherein the extraction member 50 is perpendicular to the head portion 20 extending outward therefrom. The extraction member 50 includes a first leg member 52 and a second leg member 54 having void 53 therebetween. The first leg member 52 and second leg member 54 are contiguously formed with the upper portion 56. Upper portion 56 includes outer peripheral edge 64 wherein the outer peripheral edge 64 includes section 65 that is arcuate in manner. End portion 58 is defined by the section 65 of the outer peripheral edge 64 wherein end portion 58 includes tip 60. End portion 58 is above head portion 20 as the front wall 62 provides a sufficient distance in order to create void 70. Void 70 allows a user of the hand tool 100 to engage tip 60 with an exemplary object such as but not limited to a fence staple. The arcuate shape of section 65 of the outer peripheral edge 64 is utilized to move the hand tool 100 in a rocking motion in order to provide leverage to the tip 60 and as such apply sufficient force to remove a fence staple or other object embedded in wood or other material. The perpendicular orientation of the extraction member 50 provides improved leverage as both the first side 12 and second side 14 of the hand tool 100 can be leveraged against as needed to apply the necessary force to remove the desired object such as but not limited to a fence staple. The width of the outer peripheral edge 64 is wider than the leading edge 27 of the head portion 20 and as such inhibits damage to the material from which the object is being extracted by the extraction member 50.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hand tool configured to assist a user in performing tasks associated with installation and repair of fencing wherein the hand tool comprises:

a body, said body having a first side and a second side, said first side and said second side being pivotally connected at a central axis point, said first side having an elongated handle, said second side having an elongated handle, said body having a head portion, said head portion having a first main jaw member and a second main jaw member, said head portion having a hub member, said hub member being annular in shape being contiguous with said first jaw member and said second jaw member, said hub member being surroundably mounted to said central axis point;

an extraction member, said extraction member being operably coupled to said head portion proximate said hub member, said extraction member being perpendicular to said hub member extending outward therefrom, said extraction member having a first leg member and a second leg member, said first leg member and said second leg member having a void therebetween, said first leg member and said second leg member being axially aligned, said first leg member and said second leg member being contiguously formed with an upper portion, said upper portion having a rear end and a front end, said upper portion having an outer peripheral edge, said outer peripheral edge having a section being arcuate in manner, said section being proximate said front end, said arcuate shaped section of said outer peripheral edge forming a tip at said front end of said upper portion.

2. The hand tool configured to assist a user in performing tasks associated with installation and repair of fencing as recited in claim 1, and further including a void between said tip and said head portion.

3. The hand tool configured to assist a user in performing tasks associated with installation and repair of fencing as recited in claim 2, wherein said extraction member includes a front wall, said front wall being proximate said first leg member, said front wall extending a length greater than a length of the first leg member so as to form said void between said tip and said head portion.

4. The hand tool configured to assist a user in performing tasks associated with installation and repair of fencing as recited in claim 3, wherein said tip of said extraction member is configured to engage a fence staple.

5. The hand tool configured to assist a user in performing tasks associated with installation and repair of fencing as recited in claim 4, wherein said extraction member is planar in manner.

* * * * *